(12) United States Patent
Braytenbaum et al.

(10) Patent No.: US 8,682,926 B1
(45) Date of Patent: *Mar. 25, 2014

(54) SYSTEM, METHOD, AND COMPUTER PROGRAM FOR AUGMENTING USER PROFILES

(71) Applicant: Amdocs Software Systems Limited, Dublin (IE)

(72) Inventors: Amit Braytenbaum, Jaffa (IL); Oren Agassy, Lavon (IL)

(73) Assignee: Amdocs Software Systems Limited, Dublin (IE)

( * ) Notice: Subject to any disclaimer, the term of this patent is extended or adjusted under 35 U.S.C. 154(b) by 0 days.

This patent is subject to a terminal disclaimer.

(21) Appl. No.: 13/720,878

(22) Filed: Dec. 19, 2012

Related U.S. Application Data

(63) Continuation of application No. 12/716,832, filed on Mar. 3, 2010, now Pat. No. 8,364,708.

(60) Provisional application No. 61/267,732, filed on Dec. 8, 2009.

(51) Int. Cl.
*G06F 17/30* (2006.01)

(52) U.S. Cl.
USPC .......................... 707/776; 705/319

(58) Field of Classification Search
USPC .......................... 707/776; 705/319
See application file for complete search history.

(56) References Cited

U.S. PATENT DOCUMENTS

| | | | |
|---|---|---|---|
| 7,702,653 B1* | 4/2010 | Tan et al. ............... | 707/999.107 |
| 2006/0195790 A1* | 8/2006 | Beaupre et al. ............... | 715/727 |
| 2007/0112749 A1* | 5/2007 | Huang et al. ...................... | 707/4 |
| 2008/0228745 A1* | 9/2008 | Markus et al. ..................... | 707/5 |
| 2009/0106040 A1* | 4/2009 | Jones ................................ | 705/1 |
| 2009/0112807 A1* | 4/2009 | Bahn ................................. | 707/3 |
| 2010/0088336 A1* | 4/2010 | Johnston et al. ............. | 707/770 |
| 2010/0325218 A1* | 12/2010 | Castro et al. .................. | 709/206 |

OTHER PUBLICATIONS

Billmonk, Facebook Integration and Profiles, Sep. 5, 2006.*

* cited by examiner

*Primary Examiner* — James Trujillo
*Assistant Examiner* — William Spieler
(74) *Attorney, Agent, or Firm* — Zilka-Kotab, PC

(57) ABSTRACT

A system, system, method, and computer program product are provided for augmenting a user profile utilizing data collected in association with a social network service profile. In use, a first profile of a user managed by an entity is identified. Additionally, a second profile of the user maintained by a social network service separate from the entity is identified. Further, data associated with the second profile of the user is collected. Moreover, the first profile of the user is augmented utilizing the data.

21 Claims, 5 Drawing Sheets

SYSTEM, METHOD, AND COMPUTER PROGRAM FOR AUGMENTING USER PROFILES

CROSS-REFERENCE TO RELATED APPLICATIONS

This application is a continuation of U.S. application Ser. No. 12/716,832, filed Mar. 3, 2010, which claims the benefit of U.S. Provisional Patent Application No. 61/267,732, filed on Dec. 8, 2009, the entire contents of which are incorporated herein by reference.

FIELD OF THE INVENTION

The present invention relates to user profiles, and more particularly to collecting information for storage in user profiles.

BACKGROUND

To date, user profiles managed by entities, such as business entities, have been generated utilizing information associated with the user that is gathered via the internal business processes of the entity. Accordingly, the information stored in such user profiles has generally been limited to that which is identifiable using the internal business processes of the entity. As a result, techniques for creating these user profiles have not taken advantage of information available outside of the internal business processes of the entity.

There is thus a need for addressing these and/or other issues associated with the prior art.

SUMMARY

A system, method, and computer program product are provided for augmenting a user profile utilizing data collected in association with a social network service profile. In use, a first profile of a user managed by an entity is identified. Additionally, a second profile of the user maintained by a social network service separate from the entity is identified. Further, data associated with the second profile of the user is collected. Moreover, the first profile of the user is augmented utilizing the data.

DETAILED DESCRIPTION

Figure 1:
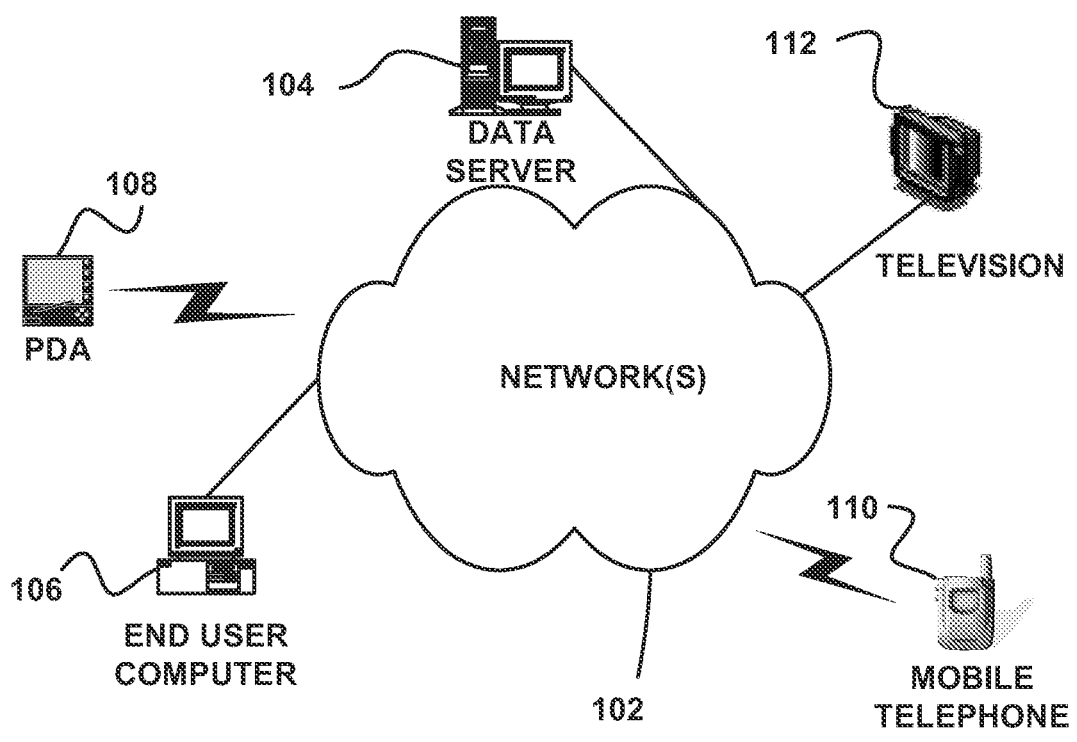
FIG. 1 illustrates a network architecture, in accordance with one possible embodiment.

FIG. 1 illustrates a network architecture 100, in accordance with one possible embodiment. As shown, at least one network 102 is provided. In the context of the present network architecture 100, the network 102 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 102 may be provided.

Coupled to the network 102, either directly or indirectly, is a plurality of devices. For example, a server computer 104 and an end user computer 106 may be coupled to the network 102 for communication purposes. Such end user computer 106 may include a desktop computer, lap-top computer, and/or any other type of logic. Still yet, various other devices may be coupled to the network 102 including a personal digital assistant (PDA) device 108, a mobile phone device 110, a television 112, etc.

Figure 2:
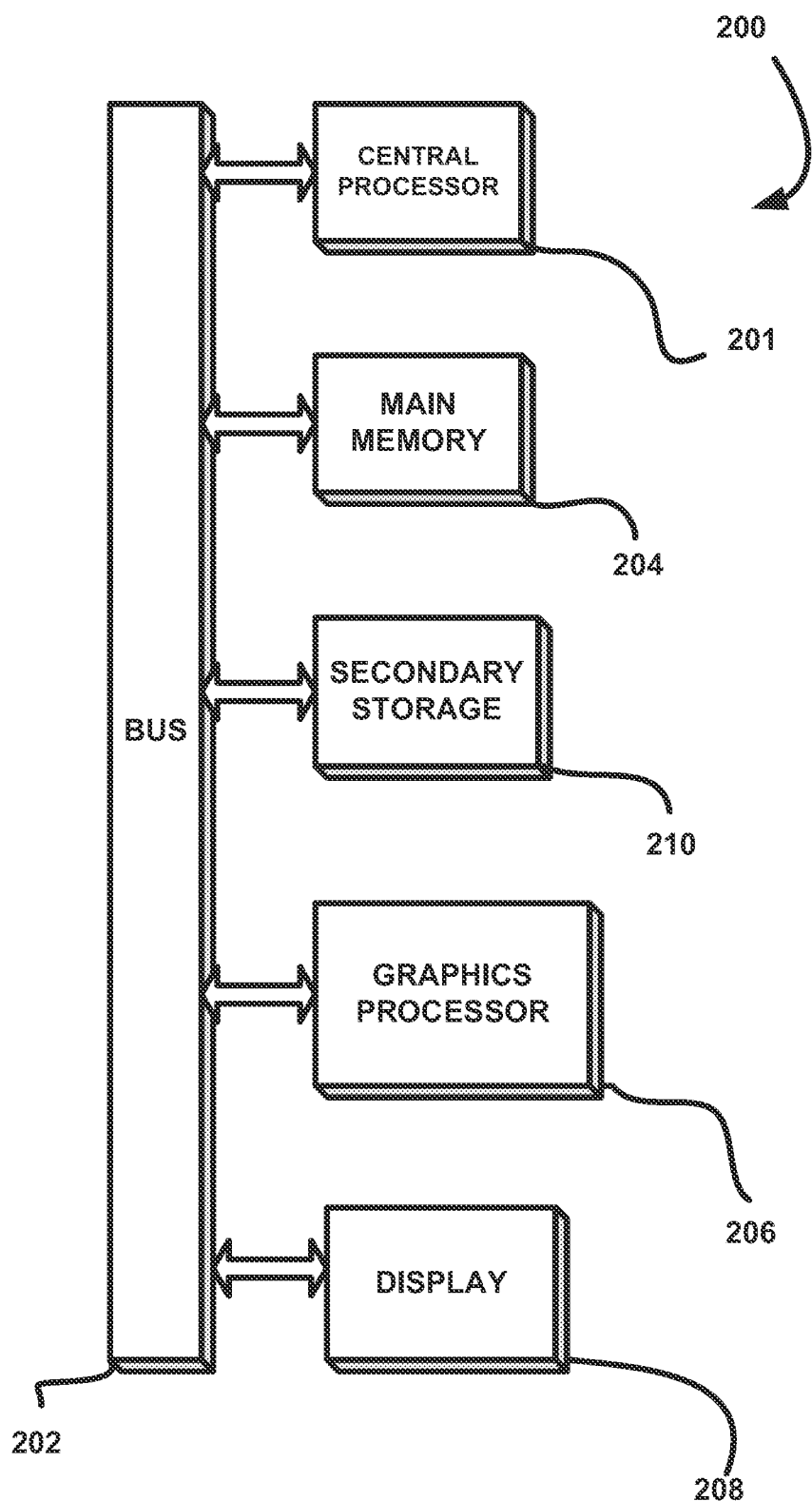
FIG. 2 illustrates an exemplary system, in accordance with one embodiment.

FIG. 2 illustrates an exemplary system 200, in accordance with one embodiment. As an option, the system 200 may be implemented in the context of any of the devices of the network architecture 104 of FIG. 1. Of course, the system 200 may be implemented in any desired environment.

As shown, a system 200 is provided including at least one central processor 201 which is connected to a communication bus 202. The system 200 also includes main memory 204 [e.g. random access memory (RAM), etc.]. The system 200 also includes a graphics processor 206 and a display 208.

The system 200 may also include a secondary storage 210. The secondary storage 210 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 204, the secondary storage 210, and/or any other memory. Such computer programs, when executed, enable the system 200 to perform various functions (to be set forth below, for example). Memory 204, storage 210 and/or any other storage are possible examples of tangible computer-readable media.

Figure 3:
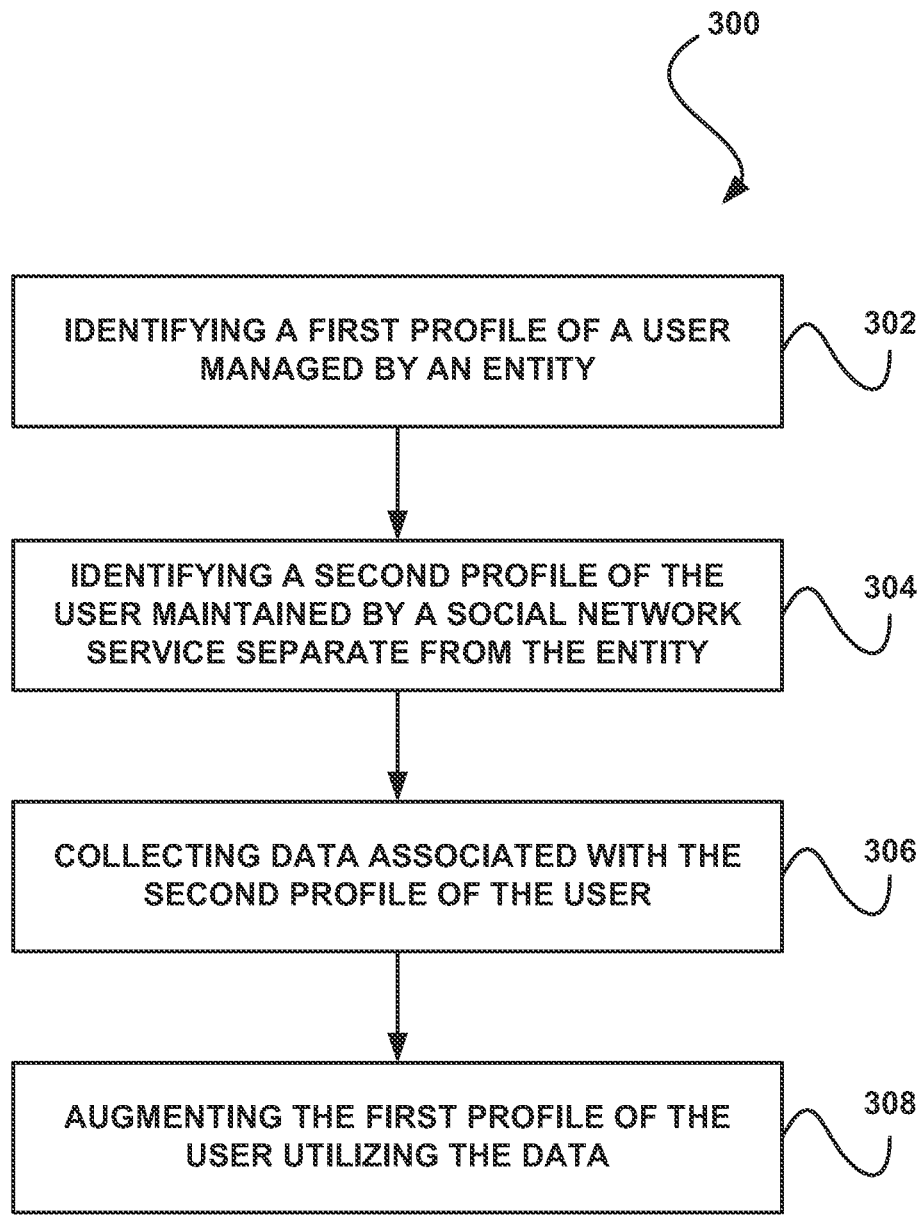
FIG. 3 illustrates a method for augmenting a user profile utilizing data collected in association with a social network service profile, in accordance with another embodiment.

FIG. 3 illustrates a method 300 for augmenting a user profile utilizing data collected in association with a social network service profile, in accordance with another embodiment. As an option, the method 300 may be carried out in the context of the details of FIGS. 1 and/or 2. Of course, however, the method 300 may be carried out in any desired environment. Further, the aforementioned definitions may equally apply to the description below.

As shown in operation 302, a first profile of a user managed by an entity is identified. In the context of the present description, the entity includes any organization, business, device, and/or any other type of entity that is capable of managing the first profile of the user. In one embodiment, the entity may include a business enterprise.

In addition, the first profile of the user may store information associated with the user that is managed by the entity. For example, the first profile of the user may include information describing the user, information describing activities of the user, etc. In various embodiments, the information stored in the first profile of the user may include a purchase history of the user, demographic information associated with the user (e.g. an age, an address, etc.), assigned products (e.g. products used by the user), assigned services (e.g. services used by the user), service consumption and details of the service consumption [e.g. content of short message service (SMS) messages, geographic location], etc.

Optionally, the first profile of the user may store information gathered by the entity. For example, the information may be gathered via internal business processes of the entity. Accordingly, the first profile of the user may store internal business support systems (BSS) data currently available to the entity or any other internal information the entity has in association with the user, in one embodiment.

It should be noted that the entity may mange the first profile of the user in any desired manner. In one embodiment, the management of the first profile of the user by the entity may include the entity storing the first profile of the user. In another embodiment, the management of the first profile of the user by the entity may include the entity updating the first profile of the user. In yet another embodiment, the management of the first profile of the user by the entity may include the entity augmenting the first profile of the user, as described in more detail below.

Further, the first profile of the user may be identified by selecting the first profile of the user from a database of profiles stored by the entity. For example, it may be determined that the first profile of the user has not yet been augmented utilizing a social network service profile of the user, has not been updated utilizing such social network service profile within a predetermined period of time, etc. Of course, however, the first profile of the user may be identified in any desired manner.

Additionally, a second profile of the user maintained by a social network service separate from the first entity is identified. Note operation 304. It should be noted that while only a single second profile of the user is described with respect to the present embodiment, a plurality of second profiles of the user which are maintained by various social network services may be identified.

In the context of the present description, the social network service may include any service providing social networking capabilities to users that is a separate entity from the entity managing the first profile of the user. The social networking capabilities may include establishing connections between user identities created via the social network service, allowing communications between users of the social network service, etc. For example, the social network service may include a social networking website (e.g. Twitter™, Facebook™, Linkedin™, etc.) or any other social networking applications or social media (e.g. available via the Internet).

To this end, the second profile of the user may store any information associated with the user that is maintained (e.g. stored, published, managed, etc.) by the social network service. Optionally, the second profile of the user may include information received from the user by the social network service. For example, such information may be received from the user for creating/updating an account with the social network service, creating/updating a personal page of the social network service for use by the user in performing social networking activities (e.g. creating user connections), etc.

In one embodiment, the second profile of the user may store published data associated with the user (e.g. data submitted to the social network service by or about the user). Such published data may include user preferences, user interests, a status associated with the user, etc. In another embodiment, the second profile of the user may store user connections associated with the user. The user connections may optionally be established utilizing the social network service. As another option, the user connections may include groups of which the user is a member, friends of the user, followers of the user, and/or any other users influencing the user, where such groups, friends, followers, etc. are identities created using the social network service.

Further, the second profile of the user may be identified in any desired manner. Optionally, the second profile of the user may be identified automatically. In one embodiment, the second profile of the user may be identified utilizing the first profile of the user.

For example, the second profile of the user may be identified by searching a plurality of profiles maintained by the social network service for identifying one of the profiles as having first information matching second information stored in the first profile of the user. Optionally, a technical engine may use the first profile of the user in order to match it to a profile maintained by the social network service. It should be noted that the first profile of the user may optionally already be augmented (as described below) with information from at least one other profile of the user maintained by at least one other social network service, such that information collected from the other social network service(s) for augmenting the first profile of the user may be used for identifying the second profile of the user maintained by the aforementioned social network service.

Just by way of example, at a first stage a full name of the user may be identified from the first profile of the user and may be used to find profiles maintained by the social network service that include the identified full name of the user. Then, at a second stage, a phone number and email address may be identified from the first profile of the user and may be compared to information stored in the profiles maintained by the social network service found during the first stage, such that a second profile maintained by the social network service with the full name of the user, the phone number, and the email address may be identified.

In another embodiment, the second profile of the user may be identified based on a connection (e.g. link) between the second profile of the user and a profile of the entity maintained by the social network service, where such connection is established utilizing the social network service. In various embodiments, the connection may include the user belonging to a group established (e.g. led) by the entity via the social network service, the user being a follower of the entity via the social network service, etc.

In yet another embodiment, the second profile of the user may be identified based on a communication between the user and a person, where a profile of the person and a profile of the entity are both maintained by the social network service and are connected utilizing the social network service. Thus, the second profile of the user may be identified based on an indirect connection to the entity via the social network service. Optionally, upon identification of a profile maintained by the social network service for which there is a communication between the user associated with the profile and the aforementioned person, the identified profile may be compared to profiles managed by the entity for identifying a match, for example, as described above.

In another embodiment, the second profile of the user may be identified utilizing facial recognition. For example, the first profile of the user may store an image of a face of the user (or data otherwise representing an image of a face of the user), which may be compared to images of user faces included in profiles maintained by the social network service. Thus, a profile maintained by the social network service with an image matching the image stored by the first profile of the user (as determined by facial recognition) may be identified as the second profile of the user.

In still yet another embodiment, the second profile of the user may be identified in response to the user accessing the social network service (e.g. the user accessing the second profile of the user). For example, a social media button on a telephone (e.g. mobile phone) of the user may be selected by the user for accessing the social network service via the telephone. Upon the user selecting the social media button, an identifier of the second profile of the user may be sent to the entity for use by the entity in identifying the second profile of the user.

Optionally, with respect to the automatic identification of the second profile of the user, the automatically identified second profile of the user may be manually validated as being associated with the user for which the first profile is managed. For example, in some cases a certainty that the first profile and the second profile are associated with the same user may not necessarily be fully assured. In various embodiments, identifying a second profile as being associated with the same user as the first profile based on a phone number and email address matching between the first profile and the second profile may be assured, whereas identifying a second profile as being associated with the same user as the first profile based on a last name and an address matching between the first profile and the second profile may not be assured.

Moreover, the second profile of the user may be identified based on information provided to the entity by the user. The information may include an identifier of the second profile of the user (e.g. a username, etc.). Of course, however, the information may include any type of information capable of allowing the entity to identify the second profile of the user.

In one embodiment, the information may be provided to the entity by the user in response to a request from the entity. For example, the user may be asked to provide an identifier of the second profile of the user in order to match the same with the first profile of the user. The request may be communicated to the user in any desired manner and in response to any desired criteria.

Optionally, the request may be automatically communicated to the user in response to operations performed by the user with respect to the social network service (e.g. becoming a member of a group established by the entity via the social network service, etc.). As another option, the request may be communicated to the user in response to identification of the user resulting from proactively searching users included in customer relationship management (CRM) of the entity. As still yet another option, the request may be communicated to the user in response to actions by the user, such as the user subscribing to a group or becoming a follower associated with the social network service, due to a campaign who suggested the user to join, as part of a package, etc. In other various embodiments, the request may be communicated to the user in response to proactively reviewing a list of users, an open CRM call, a self service session (e.g. popup the request as part of a self service occurrence), use by the user of a registration kiosk in walk-in support centers, etc.

It should be noted that the technique utilized for identifying the second profile of the user may be based on predetermined criteria. For example, the technique may be selected from a plurality of techniques (e.g. such as those described above) based on the particular social network service maintaining the second profile. Optionally, the second profile of the user may be identified utilizing an automated technique for a social network service maintaining profiles with information that is accessible and/or sufficient) for allowing an assured match with the first profile of the user. On the other hand, the second profile of the user may be identified based on information provided to the entity by the user for a social network service maintaining profiles with information that is not accessible and/or sufficient for allowing an assured match with the first profile of the user.

Further, as shown in operation 306, data associated with the second profile of the user is collected. With respect to the present description, the data that is collected from the second profile of the user may include any data capable of being collected in association with the second profile of the user. Such collection may include an extraction, identification, calculation, etc. of the data with respect to the second profile of the user.

In one embodiment, the collected data associated with the second profile of the user may include information stored by the second profile of the user. For example, as noted above with respect to the description of operation 304, the second profile of the user may store published data associated with the user (e.g. user preferences, user interests, a status associated with the user, etc) and/or user connections associated with the user (e.g. groups of which the user is a member, friends of the user, followers of the user, etc).

In another embodiment, the collected data associated with the second profile of the user may include information calculated from the second profile of the user. Optionally, the information may be calculated from an analysis of the information stored by the second profile of the user. For example, the calculated information may include a social role of the user (e.g. whether the user is an influence with respect to connections of the user within the social network service), a social rate of the user (e.g. a level of influence that the user has with respect to the connections of the user), etc.

Moreover, the first profile of the user is augmented utilizing the data, as shown in operation 308. With respect to the present embodiment, the first profile of the user may be augmented utilizing the data by enhancing, updating, etc. the first profile of the user in any manner that utilizes the data. In one embodiment, the first profile of the user may be augmented utilizing the data by storing the data in the first profile of the user.

In another embodiment, the first profile of the user may be augmented utilizing the data by merging the data with information stored in the first profile of the user, and storing the merged data in the first profile of the user. Thus, any portion of the data that is duplicative of information which is already stored in the first profile of the user may be prevented from being stored in the first profile of the user. In yet another embodiment, the first profile of the user may be augmented in a virtual manner (e.g. such as in a situation where the social network service prevents storage of information associated with the second profile of the user by the entity (e.g. for privacy reasons, etc.).

In still yet another embodiment, the first profile of the user may be augmented by downloading the data associated with the second profile of the user (e.g. via the collection of the data) such that a local cached version of the data is stored by the entity, performing a calculation on the data, storing a result of the calculation in the first profile of the user, and deleting the data stored in the local cache. Optionally, storing the data in local cache and then deleting the same, as described above, may be performed for augmenting the first profile of the user based on a policy of the social network service. To this end, by augmenting the first profile of the user utilizing the data collected from the second profile of the user maintained by the social network service, the first profile of the user may be enhanced in such a way that it better represents the user (e.g. than were the first profile of the user not enhanced).

Upon the augmentation of the first profile of the user, knowledge which is based on the augmented first profile of the user may be extracted (e.g. by the entity). For example, interest trends for the user on specific geographic areas may be identified. As another example, a plurality of augmented user profiles managed by the entity may be queried for identifying households where the most influencing user (e.g.

determined utilizing the data collected from the second profile of the user with which the first profile of the user has been augmented) has started looking into devices not available in such user's current network. Of course, however, the augmented first profile of the user may be utilized for determining marketing material relevant to the user (e.g. according to the social role of the user as determined based on the data collected from the second profile of the user), providing personalizations to the user based on the user interests as stated in the second profile of the user and activities of the user with respect to the social network service, providing a better user experience due to optional communication with the user via the user's media of choice (e.g. as identified based on the data collected from the second profile of the user), providing a unified social role and rate across various types of media for the user, etc.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
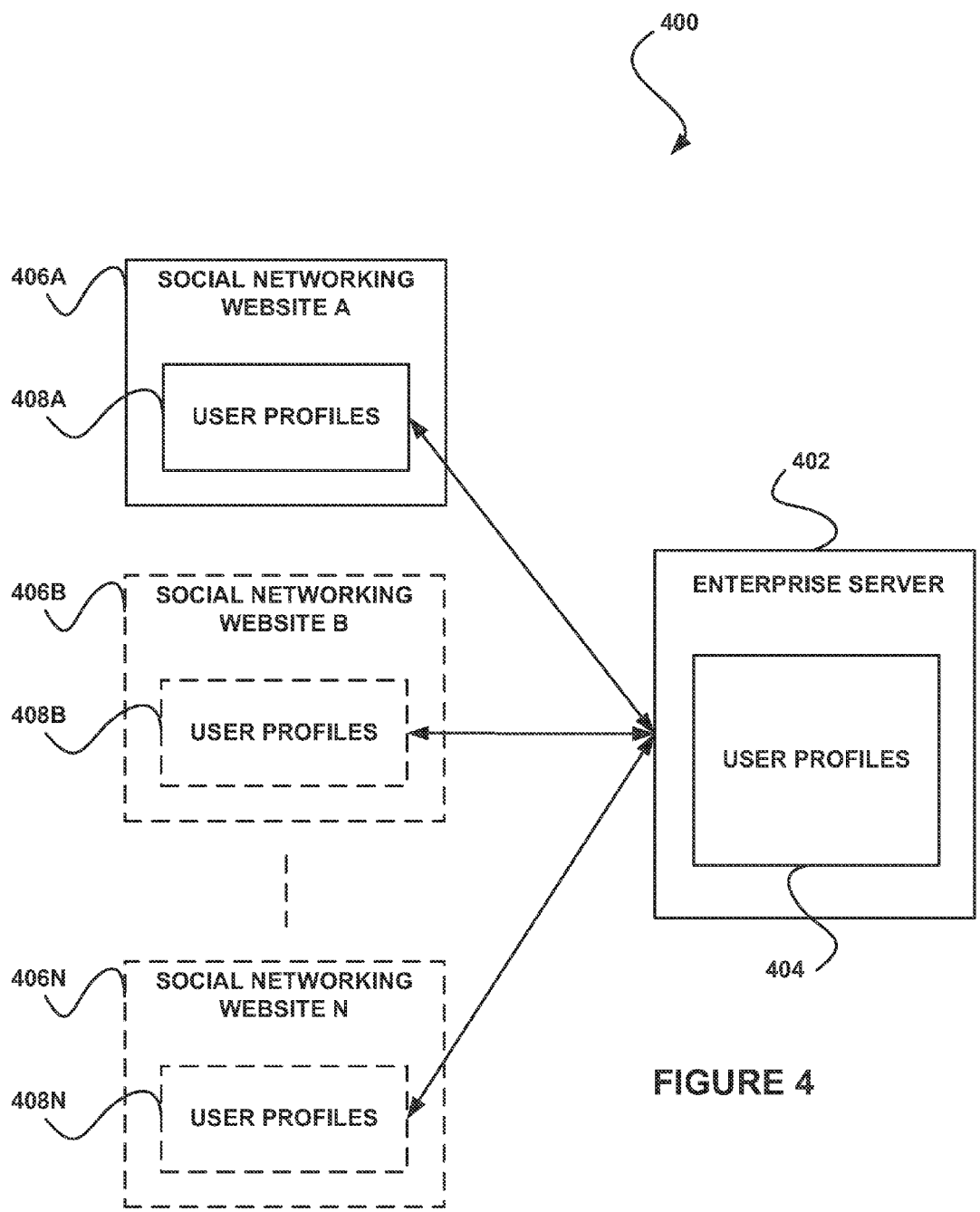
FIG. 4 illustrates a system for augmenting a user profile utilizing data collected in association with a social network service profile, in accordance with yet another embodiment.

FIG. 4 illustrates a system 400 for augmenting a user profile utilizing data collected in association with a social network service profile, in accordance with yet another embodiment. As an option, the system 400 may be implemented in the context of the details of FIGS. 1-3. Of course, however, the system 400 may be implemented in any desired environment. Further, the aforementioned definitions may equally apply to the description below.

As shown, an enterprise server 402 stores a plurality of user profiles 404. The enterprise server 402 may include a server of an enterprise business that utilizes the stored user profiles 404. For example, the enterprise business may send marketing material to users based on their associated user profiles 404, may provide a service to the users based on their associated user profiles 404, etc.

Further, the enterprise server 402 is in communication with at least one social networking website 406A-N. As shown, the enterprise server 402 may be in communication with a single social networking website 406A or a plurality of different social networking websites 406A-N. Such communication may be provided over any desired network connected to both the enterprise server 402 and the social networking websites 406A-N, such as the Internet.

Each of the social networking websites 406A-N also stores user profiles 408A-N. The user profiles 408A-N of the social networking websites 406A-N may include profiles of users of the social networking websites 406A-N. Just by way of example, the user profiles 408A-N of the social networking websites 406A-N may include accounts held by users with respect to the social networking websites 406A-N.

Initially, the enterprise server 402 identifies one of the user profiles 404 of the enterprise server 402. For example, the enterprise server 402 may select one of such user profiles 404 based upon a determination that the selected user profile 404 has not yet been augmented by a particular one of the social networking websites 406A-N (or has not been augmented by a particular one of the social networking websites 406A-N within a predetermined period of time).

Additionally, the enterprise server 402 identifies one of the user profiles 408A-N of one of the social networking websites 406A-N (e.g. the one of the social networking websites 406A-N for which the user profile 404 of the enterprise server 402 has not yet been augmented). In particular, the user profile 408A-N of the social networking website 406A-N that is associated with a same user as the user associated with the user profile 404 of the enterprise server 402 may be identified. Just by way of example, the user profile 408A-N of the social networking website 406A-N may be identified by searching the user profiles 408A-N of the social networking website 406A-N for a user profile 408A-N matching predetermined information stored in the user profile 404 of the enterprise server 402 (e.g. name, address, etc.).

Of course, while the present embodiment has been described as first identifying the user profile 404 of the enterprise server 402 and next identifying the user profile 408A-N of the social networking website 406A-N, it should be noted that the user profile 408A-N of the social networking website 406A-N may be selected initially, and then the user profile 404 of the enterprise server 402 identified. For example, the user profile 404 of the enterprise server 402 that is associated with a same user as the user associated with the user profile 408A-N of the social networking website 406A-N may be identified.

Additionally, data associated with the user profile 408A-N of the social networking website 406A-N is collected by the enterprise server 402. For example, the data may be collected by extracting the data from the user profile 408A-N of the social networking website 406A-N and/or calculating the data from information stored in the user profile 408A-N of the social networking website 406A-N.

Further, the enterprise server 402 augments the user profile 404 of the enterprise server 402 utilizing the collected data. In one embodiment, such augmentation may include updating the user profile 404 of the enterprise server 402 to include the collected data. Moreover, a user profile 408A-N of each of the social networking website 406A-N may optionally be identified for augmented the user profile 404 of the enterprise server 402, in the manner described above. To this end, the user profile 404 of the enterprise server 402 may be enhanced with the data collected from the user profile 408A-N of the social networking website 406A-N.

Figure 5:
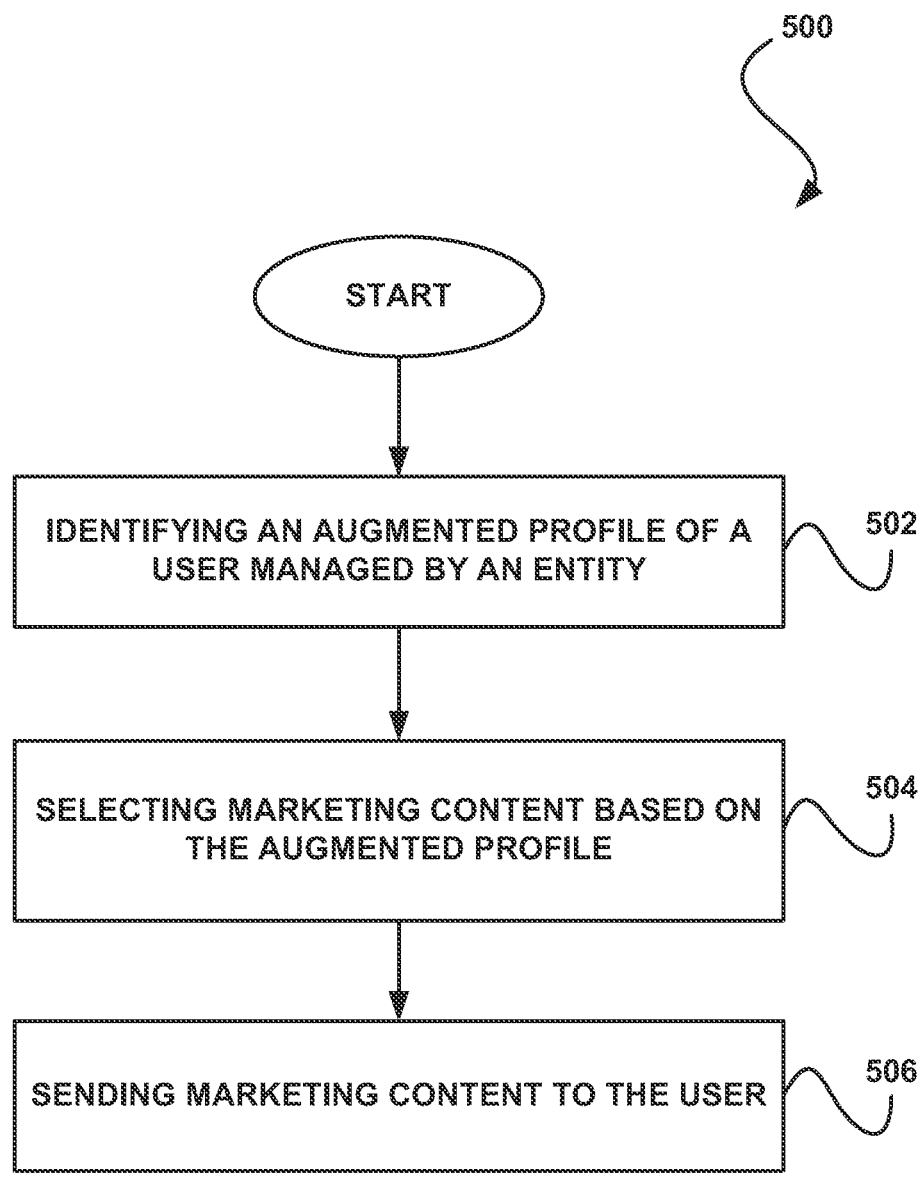
FIG. 5 illustrates a method for utilizing a user profile augmented with data collected in association with a social network service profile, in accordance with still yet another embodiment.

FIG. 5 illustrates a method 500 for utilizing a user profile augmented with data collected in association with a social network service profile, in accordance with still yet another embodiment. As an option, the method 500 may be carried out in the context of the details of FIGS. 1-4. For example, the method 500 may be carried out via the enterprise server 402 of FIG. 4. Of course, however, the method 500 may be carried out utilizing any desired environment. Again, the aforementioned definitions may equally apply to the description below.

As shown in operation 502, an augmented profile of a user managed by an entity is identified. With respect to the present embodiment, the augmented profile may include any profile that is augmented utilizing data collected in association with another profile of a user maintained by a social network service. Thus, the profile may store information internal to the entity and information from a least one social network service separate from the entity.

In addition, marketing content is selected based on the augmented profile. Note operation 504. In various embodiments, the marketing content may include advertisements, offers for products and/or services, etc.

In one embodiment, the marketing content may be selected from a plurality of available marketing content (e.g. a database of marketing content, etc.). In another embodiment, the marketing content may be selected based on a relevancy to the augmented profile. Accordingly, the marketing content may be selected based on a relevancy to data collected in association with another profile of a user maintained by a social network service which is stored in the augmented profile.

Further, the marketing content is sent to the user, as shown in operation 506. The marketing content may be sent to the user in any desired manner. Just by way of example, the marketing content may be sent to a user (e.g. over a network to a device of the user, etc.) based a preference of the user as determined from the augmented profile (e.g. from data collected in association with the other profile of the user maintained by the social network service which is stored in the augmented profile).

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer program embodied on a non-transitory computer readable medium, comprising:
    computer code for identifying a first profile of a user managed by an entity;
    computer code for identifying a second profile of the user maintained by a social network service separate from the entity;
    computer code for collecting data associated with the second profile of the user; and
    computer code for augmenting the first profile of the user utilizing the data;
    wherein the computer program is operable such that the second profile of the user is identified based on information provided to the entity by the user;
    wherein the information is provided in response to a request from the entity;
    wherein the computer program is operable such that the request is automatically communicated to the user in response to the user becoming a member of a group established by the entity via the social network service.

2. The computer program of claim 1, wherein the entity includes a business enterprise.

3. The computer program of claim 1, wherein the first profile of the user stores information associated with the user, where such information is managed by the entity, the information including at least one of a purchase history, demographic information, assigned products, assigned services, service consumption, and details of the service consumption.

4. The computer program of claim 1, wherein the social network service includes a social networking website.

5. The computer program of claim 1, wherein the second profile of the user maintained by the social network service stores published data associated with the user, the published data including at least one of user preferences, user interests, and a status associated with the user.

6. The computer program of claim 1, wherein the second profile of the user maintained by the social network service stores user connections associated with the user, the user connections established utilizing the social network service and including at least one of groups of which the user is a member, friends of the user, and followers of the user.

7. The computer program of claim 1, wherein the computer program is operable such that the second profile of the user is identified automatically.

8. The computer program of claim 7, wherein the computer program is operable such that the second profile of the user is identified utilizing the first profile of the user.

9. The computer program of claim 8, wherein the computer program is operable such that the second profile of the user is identified by searching a plurality of profiles maintained by the social network service for identifying one of the profiles as having first information matching second information stored in the first profile of the user.

10. The computer program of claim 8, wherein the computer program is operable such that the second profile of the user is identified based on a connection between the second profile of the user and a profile of the entity maintained by the social network service, the connection established utilizing the social network service.

11. The computer program of claim 8, wherein the computer program is operable such that the second profile of the user is identified based on a communication between the user and a person, where a profile of the person and a profile of the entity are both maintained by the social network service and are connected utilizing the social network service.

12. The computer program of claim 7, wherein the computer program is operable such that the automatically identified second profile of the user is manually validated as being associated with the user for which the first profile of the user is managed.

13. The computer program of claim 1, wherein the data includes information calculated from the second profile of the user.

14. The computer program of claim 13, wherein the information includes an identifier of the second profile of the user.

15. The computer program of claim 13, wherein where the calculated information includes a determination as to whether the user is an influence with respect to connections of the user.

16. The computer program of claim 1, wherein the collected data associated with the second profile of the user includes first information stored by the second profile of the user and second information calculated from the second profile of the user.

17. The computer program of claim 1, wherein the computer program is operable such that the first profile of the user is augmented utilizing the data by storing the data in the first profile of the user.

18. The computer program of claim 1, wherein the data includes a determination as to whether the user is an influence with respect to connections of the user.

19. A method, comprising:
    identifying a first profile of a user managed by an entity;
    identifying a second profile of the user maintained by a social network service separate from the entity;
    collecting data associated with the second profile of the user; and
    augmenting the first profile of the user utilizing the data;
    wherein the second profile of the user is identified based on information provided to the entity by the user;
    wherein the information is provided in response to a request from the entity;
    wherein the request is automatically communicated to the user in response to the user becoming a member of a group established by the entity via the social network service.

20. A system, comprising:
    a processor for identifying a first profile of a user managed by an entity and a second profile of the user maintained by a social network service separate from the entity, and augmenting the first profile of the user utilizing collected data associated with the second profile of the user;
    wherein the system is operable such that the second profile of the user is identified based on information provided to the entity by the user;
    wherein the information is provided in response to a request from the entity;

wherein the system is operable such that the request is automatically communicated to the user in response to the user becoming a member of a group established by the entity via the social network service.

21. The system of claim 20, wherein the processor is coupled to memory via a bus.

\* \* \* \* \*